United States Patent [19]

Baker et al.

[11] 4,001,370
[45] Jan. 4, 1977

[54] MANUFACTURING OF RESIN-AGGREGATE PIPES

[75] Inventors: Clifford Aubrey Baker, Glen Waverley, Australia; Rex Miller, deceased, late of Kilsyth, Australia, by Florence Edith Miller, executrix

[73] Assignee: Humes Limited, Melbourne, Australia

[22] Filed: Apr. 9, 1973

[21] Appl. No.: 349,479

Related U.S. Application Data

[60] Division of Ser. No. 838,009, June 16, 1969, abandoned, which is a continuation of Ser. No. 610,966, Jan. 23, 1967, abandoned.

[30] Foreign Application Priority Data

Jan. 27, 1966  Australia ............................ 916/66

[52] U.S. Cl. .............................. 264/256; 264/270; 264/312; 425/426
[51] Int. Cl.² ........................................ B28B 1/20
[58] Field of Search .......... 264/270, 312, 311, 256; 425/426

[56] References Cited

UNITED STATES PATENTS

| | | | |
|---|---|---|---|
| 2,285,497 | 6/1942 | Cuno | 264/312 |
| 2,671,260 | 3/1954 | Jessen | 264/312 X |
| 2,892,218 | 6/1959 | McGhee | 264/312 |
| 3,029,475 | 4/1962 | Bastone | 264/270 X |
| 3,340,115 | 9/1967 | Rubenstein | 264/270 X |

*Primary Examiner*—Robert F. White
*Assistant Examiner*—Thomas P. Pavelko
*Attorney, Agent, or Firm*—Stevens, Davis, Miller & Mosher

[57] ABSTRACT

Methods of centrifugally molding a resin pipe or molding a layered composite pipe utilizing a rotating inner member are disclosed. The rotating inner member rotates at a speed higher than the centrifugally rotating mold and is movable towards and away from the mold surface. Movement toward the mold compresses the molding material between the rotating inner member and the centrifugally rotating mold. Movement away from the mold permits any material adhering to the inner member to be cleaned from said inner member due to the centrifugal speed of said inner member.

6 Claims, 1 Drawing Figure

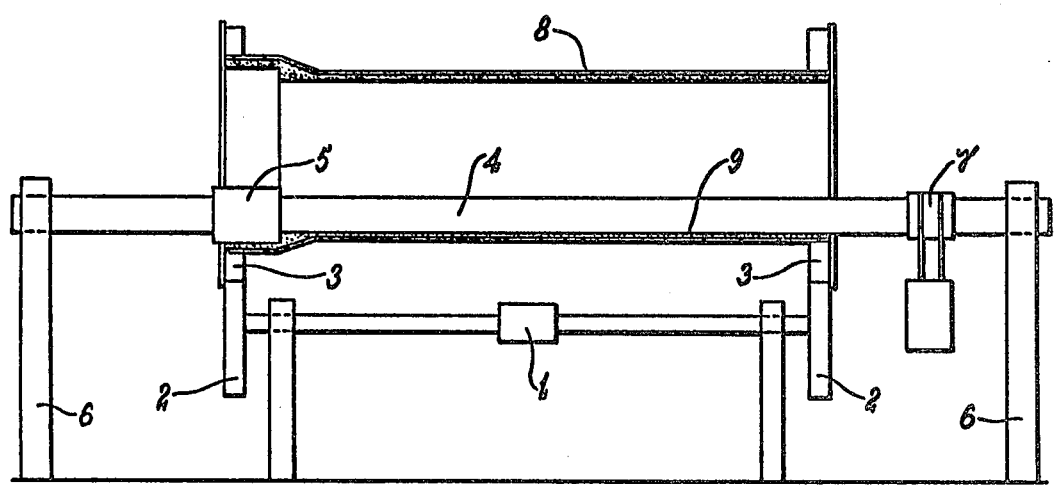

MANUFACTURING OF RESIN-AGGREGATE PIPES

This is a division of application Ser. No. 838,009, filed June 16, 1969; now abandoned, which is a continuation application of Ser. No. 610,966 filed Jan. 23, 1967 now abandoned.

The present invention relates to the manufacture of resin aggregate pipes or composite pipes composed partly of resin-aggregate and partly of concrete or other material.

It has already been proposed to provide pipes composed of a mixture of a resin, such as epoxy resin or a polyester, and an aggregate for use in conditions where their resistance to chemical and other attack is far superior to that of concrete or other pipes. However, because such resin-aggregate pipes have hitherto included a large proportion of resin, for example, resin in proportions greater than 1 part of resin to 12 parts of aggregate, by weight, they are expensive to manufacture.

It is therefore the primary object of the present invention to provide a resin-aggregate pipe in which the resin is present in proportions less than 1 part of resin to 12 parts of aggregate by weight, and even in such lean proportions as 1 part of resin to 20 or more parts of aggregate by weight thus effecting a substantial reduction in the cost of manufacture.

It is a further object of the invention to provide a resin-aggregate pipe in which a leaner mixture of resin and aggregate is used in one part of the pipe e.g. the body, than in another or other parts of the pipe e.g. the faucet, the resin in either part being present in proportions less than 1 part of resin to 12 parts of aggregate by weight. Such pipes will permit satisfactory fluid tight joints between adjacent lengths of pipes to be obtained.

It is a still further object of the invention to provide a composite pipe composed of concrete or other material having an external resin-aggregate coating and/or a resin-aggregate lining in which the resin is present in proportions less than 1 part of resin to 12 parts of aggregate by weight. Such pipes have the advantage that a less chemically resistant and cheaper material can be used for those portions of the pipe not subject to chemical attack and the resin-aggregate mixture can be used where chemical attack is likely, for instance, for the lining when the fluid flowing through the pipe is aggressive and/or for the external covering or coating when the medium in which the pipe is to be laid is aggressive.

It has hitherto been considered difficult, if not impossible, to manufacture resin-aggregate pipes in which the resin is present in proportions less than 1 part of resin to 12 parts of aggregate and therefore it is a further object of the present invention to provide a method of manufacturing resin-aggregate pipes having such lean mixtures of resin and aggregate.

According to the present invention, there is provided a resin-aggregate pipe or a composite pipe composed partly of resin-aggregate and partly of concrete or other material, in which the proportion of resin to aggregate in the pipe or in a part of the pipe is less than 1 part of resin to 12 parts of aggregate by weight. The proportion of resin to aggregate may be equal to or less than 1 part of resin to 13 parts of aggregate.

A method for the manufacture of concrete pipes is already known in which the concrete is moulded and compacted by centrifugal force and pressure in apparatus including a rotatable mould and a compacting roller mounted longitudinally of the mould. However this method cannot be satisfactorily used to manufacture resin-aggregate pipes because the tackiness of the resin may cause it to adhere to the compacting roller thus preventing proper compaction of, and the obtaining of a smooth surface on, the pipe. Also the stiffness of the mix prevents the manufacture of faucets by the conventional method.

The apparatus for manufacturing the resin-aggregate pipe of the invention may include a rotatable pipe forming mould, a compacting roller mounted to extend longitudinally of the mould rotatable on an axis parallel to the axis of the mould and movable towards and away from the internal surface of the mould, and means for applying pressure transversely of the compacting roller to the compacting roller urging the compacting roller lengthwise towards the adjacent internal surface of the mould.

The method of the invention for manufacturing a resin-aggregate pipe according to the invention utilizes the latter apparatus and comprises the steps of introducing a pipe formable resin-aggregate mixture in which the proportion of resin to aggregate is less than 1 part of resin to 12 parts of aggregate by weight into the mould, rotating the mould to apply centrifugal force to the mixture to form the pipe, moving the compacting roller into contact with the pipe being formed and rotating the compacting roller at a speed greater than the speed of rotation of the mould, applying pressure to the compacting roller to force the compacting roller against the pipe being formed to compact the mixture, reducing the pressure exerted by the compacting roller on the pipe being formed when portion of the mixture adheres to the compacting roller, increasing the pressure exerted by the compacting roller on the pipe being formed when the difference in the speed of rotation between the mould and the compacting roller causes the adhering portion of the mixture to be cleaned from the compacting roller, and repeating the steps of reducing and increasing the pressure exerted by the compacting roller on the pipe being formed until portion of the mixture no longer adheres to the compacting roller and the pipe is compacted.

After the pipe is moulded it is cured in known manner.

A composite pipe composed partly of resin-aggregate and partly of concrete or other material may be manufactured in a similar manner, the different materials to form the composite pipe being introduced into the mould separately. Spacers or formers may be used to keep the different materials in their proper positions as they are introduced into the mould.

To manufacture a composite pipe according to the invention composed of concrete or other material having an external resin-aggregate coating a pipe formable resin-aggregate mixture in which the proportion of resin to aggregate is less than 1 part of resin to 12 parts of aggregate is introduced into the mould and the coating is formed as a thin walled pipe by the above mentioned method. After the coating is set the concrete part of the pipe is moulded. To manufacture a composite pipe composed of concrete or other material having a resin-aggregate lining the concrete part of the pipe is first moulded. When the concrete pipe is set the resin-aggregate lining is applied thereto by the method above described.

Faucets may be formed on the pipes as described in our co-pending application Ser. No. 587,392, now abandoned.

The resin to be used in the resin-aggregate mixture may be a polyester, an epoxy, a coal tar epoxy, polyurethane, furane, bitumen or pitch. The resin may be used with or without a solvent, diluent, plasticizer, monomer, fungicide or bactericide. The resin may be of the type suitable for use in either hot or cold curing cycles, for example, an epoxy type with a curing agent, an unsaturated polyester with a curing agent, usually a peroxide with or without a promoter such as a metallic naphthanate, or a furane with an acidic curing agent such as sulphuric acid or p toluene sulphonic acid in a suitable solvent or a coal tar epoxy with a curing agent, the 'tar' including a coal tar pitch. Thus the resin may incorporate curing, hardening, accelerating, and promoting agents necessary to cure the pipe.

The aggregate may be crushed basalt, crushed rock or any type, gravel, sand, crushed brick or crushed tile. The particles of the aggregate may be of various sizes and shape. Some materials such as toscanite, quartz, and quartzite have greater resistance to acids such as sulphuric acid than basalt and are preferred if acids such as sulphuric acid are likely to be encountered where the pipes are to be laid. It has been found that stronger pipes are obtained when the aggregate is first artificially dried. For best results when the aggregate is tested for moisture content by drying at 120° C for 3 hours the loss in weight should not exceed 0.5%.

The mixture may include a filler such as silica powder, talc, barytes, stone duct, brick dust, tile dust, carbon black and pigments.

The strength and absorption properties of the pipes will vary with the ratio and type of aggregate, filler and resin.

The curing of the pipe can be done at ambient temperatures but curing will be accelerated by the application of heat. It is well known that water will retard curing of pure epoxy and polyester resins but steam curing at atmospheric pressure at a temperature of 150° F has been found not to retard or stay the curing of pipes made in accordance with the invention using epoxy and polyester resins. Although some loss of strength may occur if the pipe is steamed immediately after manufacture and/or subjected to steam for more than 2 hours it has been found generally satisfactory to start steam curing immediately and to continue for 2 hours at 120°–140° F. The pipe is then removed from the mould. Polyester-aggregate pipes have been stripped satisfactorily after ½ hour steaming at 130° F whilst, with ambient temperatures of 95°–100° F, polyester-aggregate pipes have been stripped within ½ hour from completion of manufacture without heating.

The pipes according to the invention may include steel reinforcements as used in concrete pipes; however because of the great strength of resin-aggregate pipes reinforcement is not usually needed.

For polyester-aggregate mixtures most normal concrete pipe mould release agents are satisfactory particularly if applied just prior to pipe manufacture. A natural resin varnish was found to be effective with epoxy-aggregate mixtures. Where bonding to a steel mould can be expected a hard grease applied over a warm mould was effective. Paper mould liners attached to the mould by adhesives may also be used.

Normal pan or paddle mixers as used in the concrete industry are satisfactory for mixing the resin and aggregate and other ingredients. The dry materials can be mixed first then the premixed liquid ingredients added. If the resin is high in viscosity or solid a steam jacketed mixer may be used. Mixing times for a polyester-aggregate mixture may be 1 minute for the dry materials and 1½ minutes after adding the resin. Fine fillers may be added last of all and may be mixed in the mixture of 1 minute.

A suitable resin-aggregate mixture to form the pipe of the invention is as follows (parts by weight)

10.6: ¼ inch size crushed basalt
6.6: sand of a grading suitable for the production of high quality concrete
1.0: fine filler (talc)
1.04: polyester, curing agent and additives.

In the testing of pipe samples produced in accordance with the invention in respect of their chemical resistance properties no observable effect occurred on polyester-aggregate, coal tar epoxy-aggregate and epoxy-aggregate samples when tested for 1 year in closed bottles containing respectively 5% lactic acid, 5% sulphuric acid, 5% acetic acid, 5% hydrochloric acid, 5% nitric acid. Concrete control samples tested under the same conditions were seriously corroded.

In the testing of similar pipe samples in respect of their weathering, water resistance and absorption properties —

1. No observable effect occurred on the samples after exposure for 1 year to weather and to 1472 hours in an Atlas Weatherometer, 2. When tested to Australian Standard A35-1957 the absorption of the samples was less than 0.6% whereas high quality spun concrete pipes absorbed 4 to 5%. Air dried samples of pipes according to the invention absorbed less than 1% water after 18 months immersion in water, 3. Abrasion resistance tests on cubes of 1-18 resin-aggregate samples in a tumbler charged with water and sand indicated that they abraded less than the same sized cubes of asbestos cement, concrete and earthenware.

Internal water pressure tests of samples of pipes according to the invention showed ultimate circumferential tensile strengths up to 700 to 1600 p.s.i. for 1/18 polyester-aggregate pipe. The same pipe showed a compressive strength of 10500 to 13000 p.s.i.

Impact tests indicated that pipes according to the invention had an impact resistance superior to concrete and earthenware pipes in a falling weight test.

In septic sewage tests pipes according to the invention exposed to a septic sewer for 1 year showed no effect whereas adjacent concrete pipes corroded seriously in the same period.

The following table illustrates the effect of the method of compaction on absorption in respect of a pipe according to the invention.

| Mix 18 parts aggregate | | 1 part polyester resin |
|---|---|---|
| Method of Compaction | % Absorption by A.S. A37 - 1957 method | % Absorption after 1 month Air dried sample in water |
| By method of patent application | 0.55 | 0.32 |
| | 0.25 | 0.21 |
| | 0.34 | 0.19 |
| Vibrated | 4.7 | 0.55 |
| Spun and Screeded | 1.64 | 0.64 |
| Vibrated while weight applied to Surface | 3.8 | 0.70 |
| Compressed at 700 p.s.i. | — | 1.9 |
| Spun | — | 2.2 |
| Compressed at 1100 p.s.i. | — | 3.6 |
| Rammed | — | 5.8 |

A resin-aggregate pipe according to the invention also may be produced by the foregoing method by utilizing a monomer-polymerization catalyst-aggregate mixture in which the proportion of monomer plus catalyst to aggregate is less than 1 part of monomer plus catalyst to 12 parts of aggregate to form the pipe, after which the pipe is heat cured and the monomer is converted into resin.

Styrene and methyl methacrylate are suitable monomers and organic peroxides are suitable polymerization catalysts and the proportion of monomer to aggregate may be between 1 part of monomer to 12 parts of aggregate by weight and 1 part of monomer to 20 parts of aggregate by weight.

Depending on the type of catalyst and proportions used the curing may be effected by heating or such means as subjecting the pipe to gamma radiation which induces formation of free radicals e.g. heating the formed pipe for 1 hour at a temperature of 120° C or 4 to 12 hours at 180° F.

Because of the volatility of the monomers end seals are usually required on the mould to prevent loss of the monomer after the previously described apparatus has been used to form the pipe up to the time when the pipe is fully cured.

A suitable monomer-polymerization catalyst-aggregate mixture to form the resin-aggregate pipe of the invention is as follows (parts by weight):

9.6: ¼ inch size crushed basalt
6.6: sand
2.0: filler
1.04: monomer, polymerization catalyst and additives.

As compared with the resin-aggregate mixer it will be noted that the content of the filler has been increased to compensate for the increased fluidity which results from substitution of the monomer for the polymer.

Alternatively about 5% to 20% polymer may be dissolved in the monomer to provide a suitable workability for pipe manufacture. The polymer may be different in composition from the cured monomer but must be compatible with it. The addition of a polymer has further advantages in that curing cycles are shortened and the possibility of disruption of the pipe caused by excessive exotherm (e.g. as sometimes occurs whilst curing methyl methacrylate with peroxides) is substantially lessened.

Apparatus suitable for manufacturing the resin-aggregate pipe of the invention is shown in the accompanying diagrammatic drawing.

The apparatus includes a motor 1 which drives the discs 2 and the mould ends 3 of the mould 8. A compacting roller 4 provided with a faucet forming enlargement 5 is supported on hydraulic rams 6 which are adapted to bring the roller 4 into contact with the resin-aggregate mixture 9 under controlled pressure. The roller 4 is rotatable by the drive 7.

The resin-aggregate resin mixture is introduced into the rotating mould 8 and the roller 4 is rotated at a speed greater than that of the mould 8. When the mould is filled with the resin-aggregate mixture the roller 4 is forced against the mixture by the rams 6 until the speed of rotation of the roller is essentially the same as that of the mould and the mixture commences to stick to the roller 4. The pressure is then reduced allowing the roller to attain its original speed. The speed differential between the mould 8 and the roller 4 causes the roller to be cleaned of the adhering material. Pressure is then re-applied on the resin-aggregate mixture and these steps are repeated as long as some of the mixture adheres to the roller. When this no longer occurs and compaction is completion, the pipe is cured and removed from the mould.

What is claimed is:

1. A method of manufacturing a hollow resin-aggregate pipe comprising the steps of introducing into a rotatable mould a pipe formable resin-aggregate mixture in the proportion of from 12 to 20 parts of aggregate to 1 part of resin by weight, rotating the mould to apply centrifugal force to the mixture to form the pipe, moving a compacting roller into contact with the pipe being formed and rotating the compacting roller at a speed greater than the speed of rotation of the mould, applying pressure to the compacting roller to force the compacting roller against the pipe being formed to compact the mixture until the speed of the roller is reduced and a portion of the mixture adheres to the compacting roller, reducing the pressure exerted by the compacting roller on the pipe being formed until the original speed of the roller is reached causing the roller to be cleaned of the adhering portion of the mixture, increasing the pressure exerted by the compacting roller on the pipe being formed until a portion of the mixture adheres to the compacting roller and repeating the steps of reducing and increasing the pressure exerted by the compacting roller on the pipe being formed until a portion of the mixture no longer adheres to the compacting roller and the pipe is compacted.

2. A method of manufacturing a hollow resin-aggregate pipe comprising the steps of introducing into a rotatable mould a pipe formable monomer-polymerization catalyst-aggregate mixture in a proportion sufficient to produce a product having a ratio of from 12 to 20 parts of aggregate to 1 part of resin by weight, rotating the mould to apply centrifugal force to the mixture to form the pipe, moving a compacting roller into contact with the pipe being formed and rotating the compacting roller at a speed greater than the speed of rotation of the mould, applying pressure to the compacting roller to force the compacting roller against the pipe being formed to compact the mixture until the speed of the roller is reduced and a portion of the mixture adheres to the compacting roller, reducing the pressure exerted by the compacting roller on the pipe being formed until the original speed of the roller is reached causing the roller to be cleaned of the adhering portion of the mixture, increasing the pressure exerted by the compacting roller on the pipe being formed until a portion of the mixture adheres to the compacting roller, repeating the steps of reducing and increasing the pressure exerted by the compacting roller on the pipe being formed until a portion of the mixture no longer adheres to the compacting roller and the pipe is compacted and heat curing the formed pipe to convert the monomer into resin.

3. The method of claim 1 including introducing a layer of other pipe forming material into the resin-aggregate pipe after the resin-aggregate pipe is set, rotating the mould to form a composite pipe, moving the compacting roller into contact with the other pipe forming material being formed, rotating the compacting roller at a speed greater than the speed of rotation of the mould, applying pressure to the compacting roller to force the compacting roller against the pipe being formed to compact the other pipe forming material until the speed of the roller is reduced and a portion of the material adheres to the compacting roller, reducing the pressure exerted by the compacting roller on the composite pipe being formed until the original speed of the roller is reached causing the roller to be cleaned of the adhering portion of the material, increasing the pressure exerted on the composite pipe being formed until a portion of the material adheres to the compacting roller and repeating the steps of reducing and increasing the pressure exerted by the compacting roller on the composite pipe being formed until a portion of the material no longer adheres to the compacting roller and the composite pipe is compacted.

4. The method of claim 1 including introducing a layer of other pipe forming material into the rotatable mould and forming a pipe therefrom prior to the introduction of the resin-aggregate mixture, rotating the mould to apply centrifugal force to the other pipe forming material to form a pipe, moving the compacting roller into contact with the other pipe forming material being formed, rotating the compacting roller at a speed greater than the speed of rotation of the mould, applying pressure to the compacting roller to force the compacting roller against the pipe being formed to compact the other pipe forming material until the speed of the roller is reduced and a portion of the material adheres to the compacting roller, reducing the pressure exerted by the compacting roller on the pipe being formed until the original speed of the roller is reached causing the roller to be cleaned of the adhering portion of the material, increasing the pressure exerted on the pipe being formed until a portion of the material adheres to the compacting roller and repeating the steps of reducing and increasing the pressure exerted by the compacting roller on the pipe being formed until a portion of the material no longer adheres to the compacting roller and the pipe is compacted.

5. The method of claim 3 wherein the resin-aggregate mixture is in the form of a monomer-polymerization catalyst aggregate mixture and including the step of heat curing the formed composite pipe to convert the monomer into polymer.

6. The method of claim 4 wherein the resin-aggregate mixture is in the form of a monomer-polymerization catalyst aggregate mixture and including the step of heat curing the formed composite pipe to convert the monomer into polymer.

* * * * *